United States Patent

Merritts

[11] Patent Number: 6,079,640
[45] Date of Patent: Jun. 27, 2000

[54] AUTO UNDERWASHER

[76] Inventor: Gary W. Merritts, 303 Aiken Ter., Abingdon, Md. 21009

[21] Appl. No.: 09/058,921

[22] Filed: Apr. 13, 1998

[51] Int. Cl.[7] .................................................. B05B 15/06
[52] U.S. Cl. .......................... 239/532; 239/556; 239/566; 239/588; 239/722; 239/754
[58] Field of Search ..................................... 239/525, 532, 239/271, 280, 550, 556, 557, 560, 561, 566, 568, 588, 567, DIG. 6, 722, 754; 134/123, 172

[56] References Cited

U.S. PATENT DOCUMENTS

| | | |
|---|---|---|
| D. 321,574 | 11/1991 | Shevers et al. . |
| 430,257 | 6/1890 | Taylor ................................. 239/550 X |
| 615,486 | 12/1898 | Jendis ................................. 239/566 X |
| 1,177,884 | 4/1916 | Molesta et al. ...................... 239/550 X |
| 1,628,118 | 5/1927 | Coles ................................... 239/550 |
| 2,056,240 | 10/1936 | Wheeler . |
| 2,339,632 | 1/1944 | Folsom ................................ 239/560 |
| 2,911,157 | 11/1959 | Converse . |
| 3,023,969 | 3/1962 | Hudson et al. . |
| 3,185,397 | 5/1965 | Nelson ................................. 239/556 |
| 3,811,621 | 5/1974 | Augustine ........................... 239/550 X |
| 4,022,382 | 5/1977 | Engdahl, Jr. ........................ 239/566 X |
| 4,580,726 | 4/1986 | Unger . |
| 4,600,153 | 7/1986 | Stone ................................... 239/556 X |
| 4,706,889 | 11/1987 | Hofmann ............................. 239/550 |
| 4,865,255 | 9/1989 | Lavisotto . |
| 4,899,940 | 2/1990 | Leaver ................................ 239/532 X |
| 4,930,706 | 6/1990 | Merlin ................................. 239/754 |
| 4,984,746 | 1/1991 | Joyal . |
| 5,154,356 | 10/1992 | Sorenson ............................. 239/550 |
| 5,653,392 | 8/1997 | Wells . |
| 5,707,014 | 1/1998 | Chan et al. . |

FOREIGN PATENT DOCUMENTS

| | | |
|---|---|---|
| 238283 | 9/1960 | Australia . |
| 553140 | 2/1958 | Canada ............................... 239/532 |
| 657797 | 2/1959 | Italy .................................... 239/532 |
| 1348880 | 3/1974 | United Kingdom . |

*Primary Examiner*—Andres Kashnikow
*Assistant Examiner*—Steven J. Ganey
*Attorney, Agent, or Firm*—Richard C. Litman

[57] ABSTRACT

An auto underwasher for cleaning the underside of an automobile, comprising a ½" malleable metal alloy pipe approximately 6.5 feet in length and having a generally modified-Z shaped body. The user grasps one end of the device by vinyl grips attached to the top and middle legs of the device, the top leg being connected to a liquid cleaner supply source. The bottom leg of the device has a crimped and sealed end forming a nozzle with a plurality of jets aligned longitudinally. The length of the middle leg permits the user to stand upright while extending the bottom leg to direct the spray under the automobile body, removing dirt, road salts, and chemicals which might otherwise corrode the exposed undercarriage of the vehicle.

6 Claims, 3 Drawing Sheets

AUTO UNDERWASHER

BACKGROUND OF THE INVENTION

1. Field of the Invention

The present invention relates to water spraying devices, and, more particularly, to a hand held apparatus for cleaning the underside of an automobile by means of a spray or jet of water.

2. Description of the Related Art

A number of devices have been developed for providing a spray wash to clean the underbody of an automobile. The majority of such devices have a multiplicity of parts, usually including wheels and casters or other devices for rolling the device on the ground under the vehicle. Less complicated devices have a limited spray area or number of nozzles or spray orifices, rendering the spray coverage area of the underbody problematical.

U.S. Pat. No. 4,580,726 issued Apr. 8, 1986 to Michael J. Unger teaches an Under-Car Wash device comprising a body or housing mounted on wheels having swivel-type castors with upwardly directed spray nozzles connected by a hollow handle having means for connection to a hose. U.S. Pat. No. 4,984,746 issued Jan. 15, 1991 to George L. Joyal describes a T-shaped frame having a T-shaped frame mounted on a plurality of wheels including at least one castor wheel, a plurality of pivoting or rotating spray nozzles on the base of the T-shaped frame, and a handle having means for connection to a liquid cleaner supply. U.S. Des. Pat. No. 321,574 shows a two section Z-shaped handle having a control valve at one end and a cross-member at the other end, the cross-member being mounted on wheels and having a plurality of upwardly directed spray nozzles across the top surface of the cross-member.

U.S. Pat. No. 5,653,392 issued Aug. 5, 1997 to Joseph H. Wells describes a tube connected to a T having wheels at the end of the arms of the T, the arms having a plurality of orifices for spraying the underbody of an automobile. U.S. Pat. No. 5,707,014 issued Jan. 13, 1998 to Chan, et al. teaches a frame mounted on wheels including a plate mounted on a cross member, the plate being the top of a water chamber and having a plurality of holes to form a spray for cleaning the underbody of an automobile. British Patent No. 1,348,880 published Mar. 27, 1974 discloses a two section tubing, the first an elongated S-shape tubing with a fitting for a hose, the second section having an L-shape with a brass nozzle for washing a car underbody. It is noted that the device only provides a single jet through the brass nozzle. A second embodiment is described with a rose and a wheeled body.

Various other spraying devices have been disclosed, some for cleaning, others for painting, applying pesticides, etc. Representative samples include U.S. Pat. No. 2,050,240 issued Oct. 6, 1936 to Freeman Wheeler (mobile steam cleaner with sprayer); U.S. Pat. No. 2,911,157 issued Nov. 3, 1959 to Sherman Converse (wheeled pressure tank for spray painting brown grass green); U.S. Pat. No. 3,023,969 issued Mar. 6, 1962 to Hudson, et al. (mobile pressure tank sprayer with novel handle); U.S. Pat. No. 4,865,255 issued Sep. 12, 1989 to Roy G. Lavisotto (mobile sprayed with a large tank mounted on a cart over a pump motor); and Australian Patent No. 238,283 published Sep. 8, 1960 (pesticide sprayer with water aspirated pump).

None of the above inventions and patents, taken either singularly or in combination, is seen to describe the instant invention as claimed. Thus a auto underwasher solving the aforementioned problems is desired.

SUMMARY OF THE INVENTION

The present invention is an auto underwasher for cleaning the underside of an automobile, comprising a ½" malleable metal alloy pipe approximately 6.5 feet in length and having a generally modified-Z shaped body. The user grasps one end of the device by vinyl grips attached to the top and middle leg legs of the device, the top leg being connected to a garden hose by a conventional female coupler. In one embodiment, the bottom leg of the device has a crimped and sealed end forming a nozzle with a plurality of orifices aligned longitudinally to emit a plurality of jets. The length of the middle leg of the device permits the user to remain in an upright position while extending the bottom leg of the device to direct the spray under the automobile body, removing dirt, road salts, and chemicals which might otherwise corrode the exposed undercarriage of the vehicle.

In a second embodiment, the bottom leg of the device has a plurality of orifices, each of which has a nozzle assembly which emits a conical spray in a more dispersed pattern.

Accordingly, it is a principal object of the invention to provide a simple device for cleaning the underside of an automobile which only requires access to a supply of cleaning liquid and a garden hose.

It is another object of the invention to provide a device for cleaning the underside of an automobile which can be economically manufactured due to uncomplicated construction and economy of parts.

It is a further object of the invention to prevent unnecessary and expensive automobile repairs by inhibiting corrosion and deterioration of exposed parts on the undercarriage of the vehicle by providing a convenient and easy to use device to remove dirt, road salts and chemicals from the underside of the vehicle.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
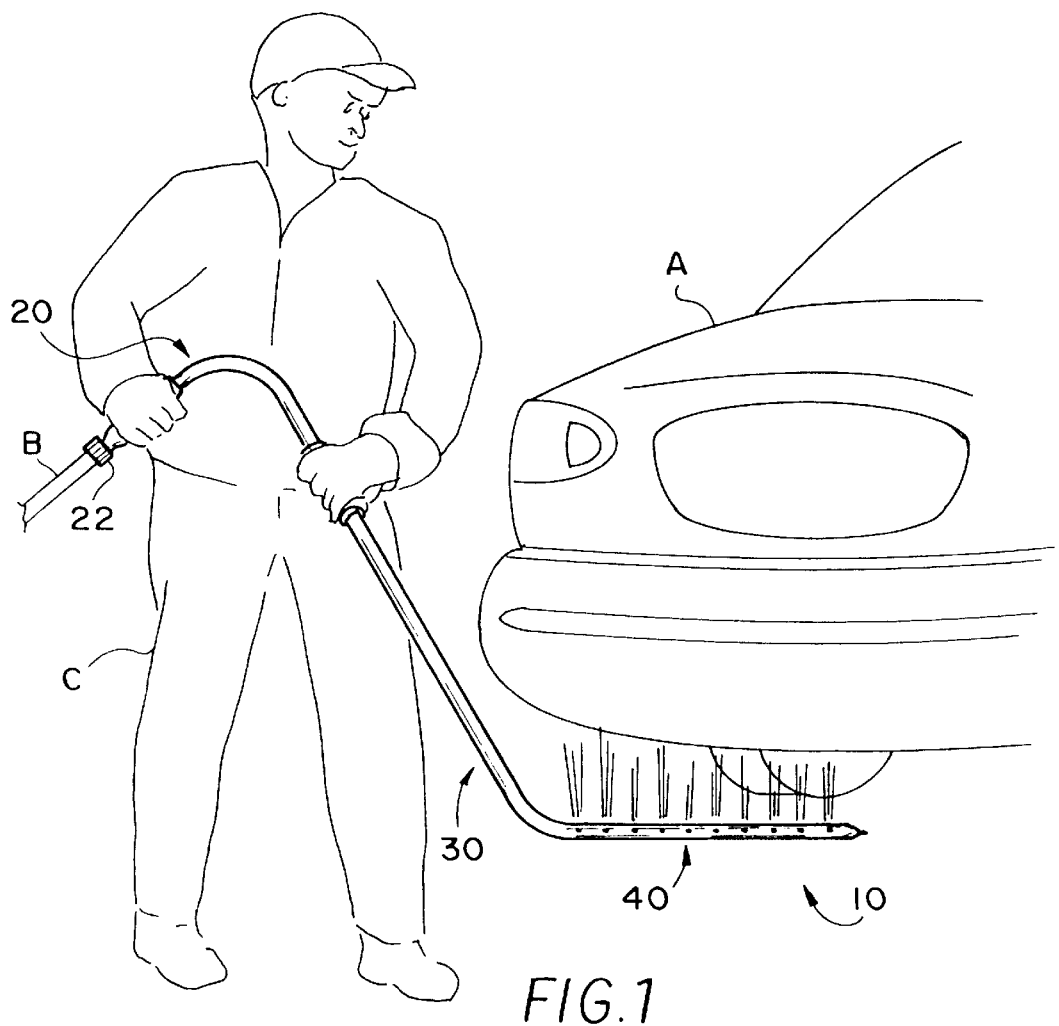
FIG. 1 is an environmental, perspective view of an auto underwasher according to the present invention.
Figure 2:
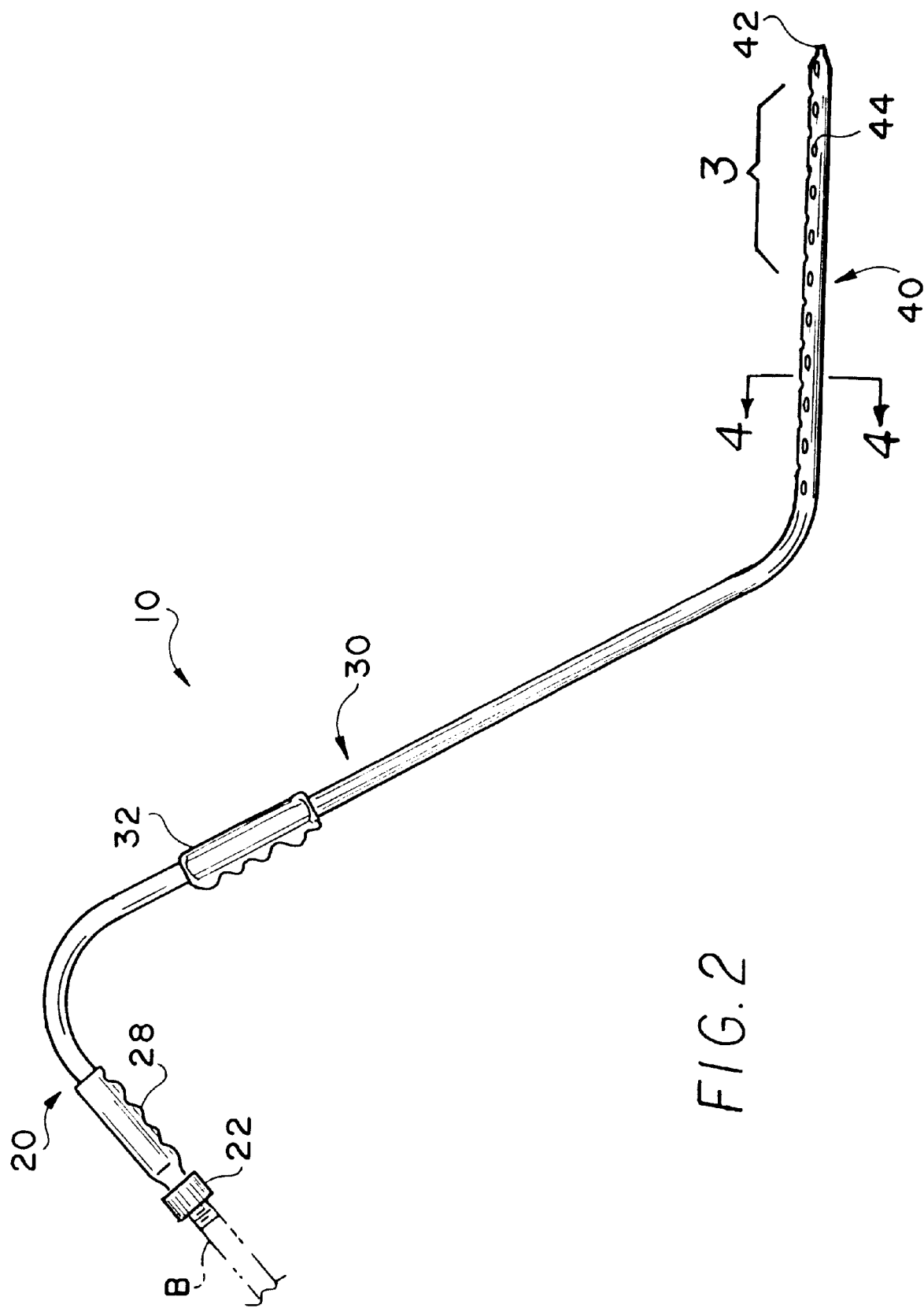
FIG. 2 is a side elevational view of the auto underwasher of the present invention.

The present invention an auto underwasher as shown in FIGS. 1 through 4. The auto underwasher is designated generally as 10 in the figures. As best shown in FIG. 2, the auto underwasher 10 comprises an integral, one piece tubular body having three sections, a top leg 20, a middle leg 30, and a bottom leg 40. In the preferred embodiment, the body is made from a malleable metal alloy, such as aluminum.

However, the material is not critical, and the body of the auto underwasher 10 may be made of a rigid plastic, synthetic polymeric material, etc..

The body of the auto underwasher 10 is approximately 6.5 feet in length and has an elongated, modified-Z shape. The top leg 20 has connection means for connecting the auto underwasher 10 to a supply or reservoir of a liquid cleaner. In the preferred embodiment, the connection means is simply a threaded female fitting 22 adapted for receiving the threaded male fitting of an ordinary garden hose B, and the liquid cleaner is an ordinary household water supply. It will be evident to those skilled in the art that the auto underwasher 10 may be connected to other supplies or reservoirs of liquid cleaners, e.g., pressurized supply tanks, chemical cleaning solutions, etc.

The top leg 20 further includes a vinyl or foam rubber hand grip 28. The top leg 20 is approximately six inches in length and is joined to the middle leg 30 by an approximately 5" radius arc in the tubular body of the auto underwasher 10 so that the top leg 20 and the middle leg 30 are separated by an approximately 80° angle. The middle leg 30 further comprises a second vinyl or foam rubber hand grip 32. The middle leg 30 extends for approximately 42" and is joined to the bottom leg 40 by an approximately 5" radius arc in the tubular body of the auto underwasher 10 so that the middle leg 30 and the bottom leg 40 are separated by an approximately 120° angle.

The position of the vinyl hand grips 28 and 32, the length of the middle leg 30, and the modified-Z shape of the auto underwasher 10 are adapted so the auto underwasher 10 may be conveniently grasped by the operator C who may insert the bottom leg 40 underneath a vehicle A to clean the underbody while standing in an upright position.

The bottom leg 40 of the auto underbody 10 has a crimped end 42. The end 42 may be crimped by a vise, by hydraulic machinery or other means, or the body may be blow molded plastic having a closed and sealed end. The end 42 is sealed in order to provide a waterproof termination at the end 42 of the bottom leg 40, which may be accomplished by placing a quantity of silicone sealant in the end 42 before crimping, or by welding or soldering the end 42 as required.

Figure 3:
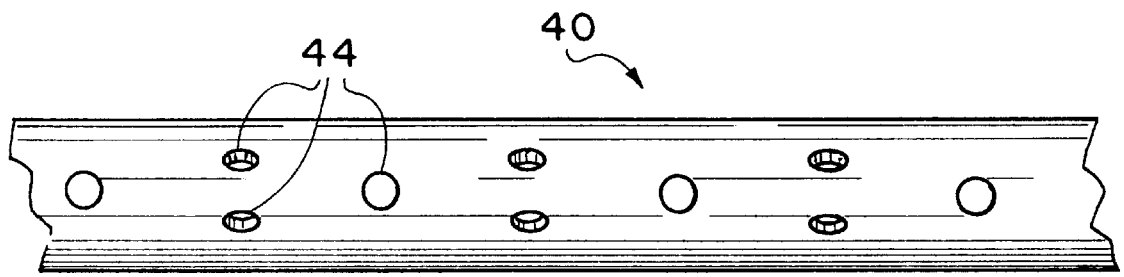
FIG. 3 is an partial, enlarged scale view of the bottom leg of the auto underwasher shown in FIG. 2.
Figure 4:
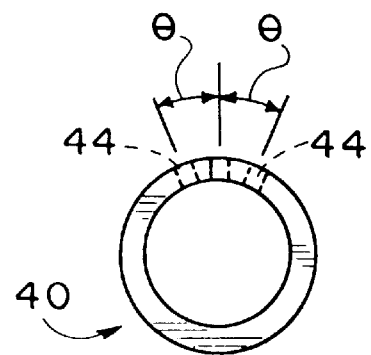
FIG. 4 is a sectional view taken along the line 4—4 in FIG. 2.

The diameter of the auto underwasher's tubular body 10 is ½". In the preferred embodiment, the bottom leg 40 has a plurality of orifices 44 approximately ¹⁄₁₆" in diameter defined therein. The bottom leg 40 extends for approximately 20". In the preferred embodiment, as best shown in FIGS. 3 and 4, the bottom leg includes approximately 32 orifices 44 extending in three longitudinal rows, a center row of approximately ten orifices 44, a left row of approximately eleven orifices 44, and a right row also of approximately eleven orifices 44, the orifices 44 in adjoining rows being staggered, the left and right rows each being separated from the center row by angle θ of about 20°. The pressure from an ordinary household water supply through an ordinary garden hose is sufficient to produce from the bottom leg 40 a multi-jet spray comprising 32 concentrated jets extending for a length of 15" to 20" in a 40° arc.

Figure 5:
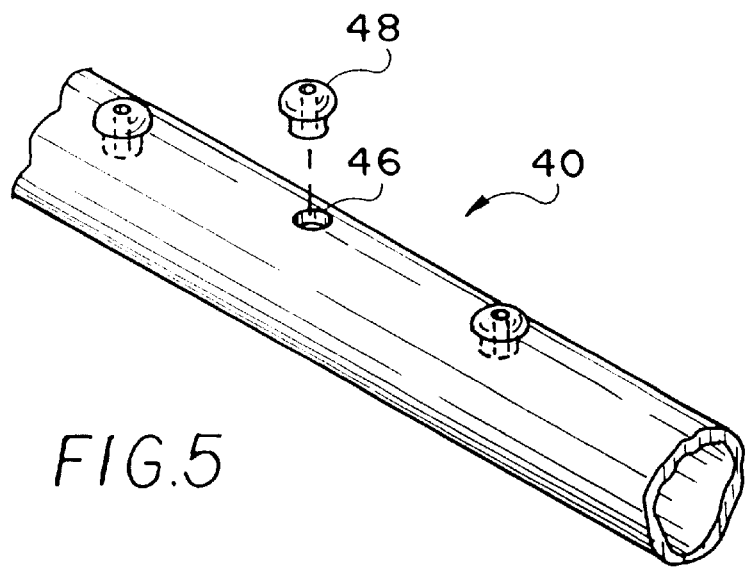
FIG. 5 is an partial, enlarged scale view of the bottom leg of an alternative embodiment of the auto underwasher.

In an alternative embodiment, as shown in FIG. 5, the bottom leg 40 comprises only 4 orifices 46 extending longitudinally in a single row. Each of the orifices 46 has a nozzle assembly 48 inserted therein. Nozzle assemblies 48 are conventional nozzles well known in the prior art which direct the liquid cleaner upwards in a conical spray.

In operation, the auto underwasher 10 is connected to a supply or reservoir of a liquid cleaner by fitting 22 in top leg 20. The auto underwasher 10 is grasped by the operator C using hand grips 28 and 32 on top leg 20 and middle leg 30. The flow of liquid cleaner is started by opening a valve on the supply or reservoir. The operator C places the bottom leg 40 of the auto underwasher 10 under the body of a vehicle A. The pressure from the supply forces a flow of liquid cleaner through the tubular body of the auto underwasher 10, where it exits in a multi-jet stream through the orifices 44 in bottom leg 40, directing a wide angle spray of cleaning fluid at the underbody of the vehicle A. The operator C simply walks around the perimeter of the vehicle A to complete cleaning of the underbody.

It will be apparent to those skilled in the art that various improvements can be made to the auto underwasher 10, such as the addition of an on-off valve at the top leg 20 of the auto underwasher 10. Part of the design philosophy behind the auto underwasher 10 is to avoid a multiplicity of parts and to keep construction simple, in order to make the auto underwasher 10 relatively economical and attractive to manufacturers while providing a spray pattern sufficient to provide adequate cleaning of the vehicle A underbody.

It is to be understood that the present invention is not limited to the embodiments described above, but encompasses any and all embodiments within the scope of the following claims.

What is claimed is:

1. An auto underwasher comprising an integral, modified-Z shaped tubular body for use with a liquid cleaner supply having:
    a) a top leg including connection means for connecting said auto underwasher to the liquid cleaner supply;
    b) a middle leg;
    c) a bottom leg having a crimped and sealed end and having a plurality of orifices so that the bottom leg forms a spray head adapted for emitting liquid cleaner in a multi-jet spray; and wherein:
    d) the length of the middle leg and the modified-Z shaped body are dimensioned for operation of said auto underwasher by an operator standing in an upright position; and
    e) said plurality of orifices extend longitudinally along the length of said bottom leg in a plurality of rows, the plurality of rows being separated by an angle of approximately 20°, the spacing between orifices in adjoining rows being staggered.

2. The auto underwasher according to claim 1, further comprising:
    a) a vinyl hand grip attached to the top leg of said auto underwasher; and
    b) a second vinyl hand grip attached to the middle leg of said auto underwasher.

3. The auto underwasher according to claim 2, wherein said tubular body is made from a malleable metal alloy.

4. The auto underwasher according to claim 3, wherein said malleable metal alloy is made predominantly from aluminum.

5. An auto underwasher comprising an integral, modified-Z shaped tubular body for use with a liquid cleaner supply having:
    a) a top leg including connection means for connecting said auto underwasher to the liquid cleaner supply;
    b) a middle leg;
    c) a bottom leg having a crimped and sealed end and a plurality of orifices so that the bottom leg forms a spray head adapted for emitting liquid cleaner in a multi-jet spray; and wherein:
    d) the length of the middle leg and the modified-Z shaped body are dimensioned for operation of said auto underwasher by an operator standing in an upright position;
    e) said tubular body is made substantially from a rigid, synthetic polymeric material; and f) said plurality of orifices extend longitudinally along the length of said bottom leg in a plurality of rows, the plurality of rows being separated by an angle of approximately 20°, the spacing between orifices in adjoining rows being staggered.

6. The auto underwasher according to claim 5, further comprising:

a) a vinyl hand grip attached to the top leg of said auto underwasher; and b) a second vinyl hand grip attached to the middle leg of said auto underwasher.

* * * * *